United States Patent [19]

Hermann et al.

[11] 4,327,061

[45] Apr. 27, 1982

[54] METHOD OF STABILIZING WET PROCESS PHOSPHORIC ACID FOR SOLVENT EXTRACTION

[75] Inventors: John A. Hermann, Oklahoma City, Okla.; Michael F. Lucid, Houston, Tex.

[73] Assignee: Kerr-McGee Chemical Corporation, Oklahoma City, Okla.

[21] Appl. No.: 164,583

[22] Filed: Jun. 30, 1980

Related U.S. Application Data

[63] Continuation-in-part of Ser. No. 13,546, Feb. 21, 1979, abandoned.

[51] Int. Cl.$^3$ .................... B01D 11/00; C01G 56/00; C22B 60/02; C01B 25/16
[52] U.S. Cl. ............................................ 423/8; 423/9; 423/10; 423/63; 423/321 S
[58] Field of Search ................... 423/319, 320, 321 R, 423/321 S, 8, 9, 10, 63; 75/101 BE

[56] References Cited

U.S. PATENT DOCUMENTS

| | | | |
|---|---|---|---|
| 3,206,282 | 9/1965 | Crawford et al. | 423/321 R |
| 3,607,029 | 9/1971 | Goret et al. | 423/321 S |
| 3,684,439 | 8/1972 | Rose et al. | 423/321 S |

FOREIGN PATENT DOCUMENTS 1113922  5/1968  United Kingdom ............ 423/321 R

*Primary Examiner*—O. R. Vertiz
*Assistant Examiner*—Gregory A. Heller
*Attorney, Agent, or Firm*—William G. Addison

[57] ABSTRACT

A method of stabilizing wet process phosphoric acid containing acid soluble impurities preparatory to solvent extraction for the recovery of valuable minerals. The acid is introduced into a vessel containing crystal seed bed of the impurities. A portion of the acid then is withdrawn and concentrated to effect supersaturation of the impurities contained therein. The supersaturated acid is returned to the vessel to mix with the remaining solution and cause additional impurities to precipitate. Thereafter, a portion of the solution, containing precipitated impurities, is withdrawn and introduced into a separator. In the separator, the solution is separated into an essentially solids-free stream containing unprecipitated soluble impurities and a solids-containing stream. The solids-free stream is admixed with an aqueous diluent to dilute it to a concentration level below the concentration at which the precipitable impurities are saturated therein but without a substantial change in phosphate concentration to thereby stabilize the acid stream. The stabilized acid is contacted with an organic extractant to selectively extract at least one of the remaining unprecipitated soluble impurities without substantial precipitation of any other of the remaining soluble impurities.

9 Claims, 1 Drawing Figure

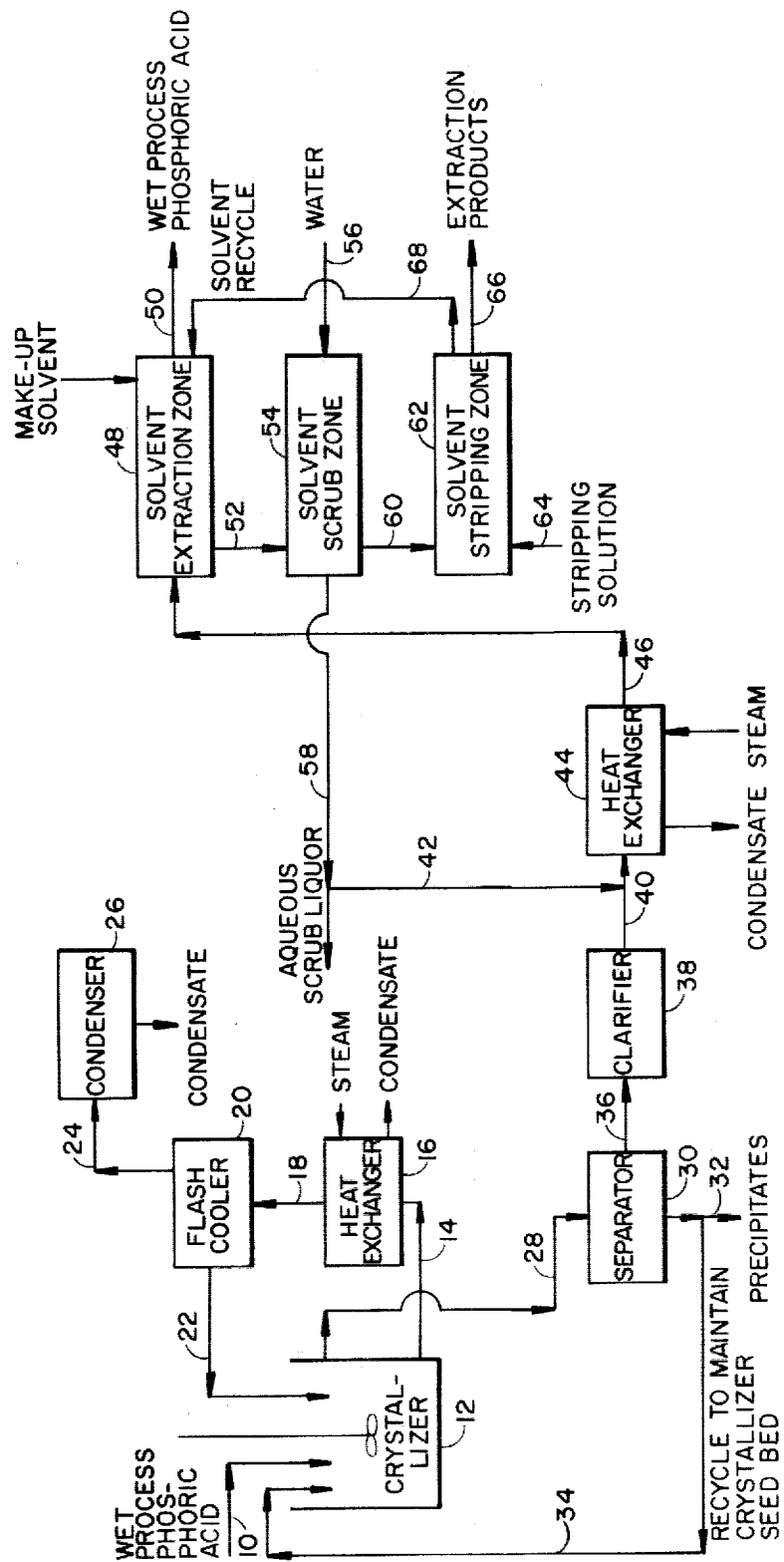

METHOD OF STABILIZING WET PROCESS PHOSPHORIC ACID FOR SOLVENT EXTRACTION

CROSS-REFERENCE TO RELATED APPLICATION

This application is a continuation-in-part of applicants' copending application Ser. No. 13,546 entitled "Method Of Stabilizing Wet Process Phosphoric Acid For Solvent Extraction" filed Feb. 21, 1979 now abandoned.

BACKGROUND OF THE INVENTION

1. Field of the Invention

A method of stabilizing wet process phosphoric acid containing acid soluble impurities preparatory to solvent extraction.

2. Brief Description of the Prior Art

Wet process phosphoric acid is prepared by reacting phosphate rock with sulfuric acid. The reaction product is filtered and then washed to yield a crude aqueous acidic solution known as "wet process phosphoric acid." The crude aqueous product contains significant amounts of dissolved impurities. Impurities which almost always are present are calcium, sodium, potassium, iron, aluminum and magnesium cations and sulfate and fluorosilicate anions. The wet process phosphoric acid also has been found to contain either or both vanadium and uranium.

Numerous processes have been developed to recover either or both vanadium and uranium from wet process phosphoric acid by solvent extraction using organic extractants. Generally, such processes provide a method of contacting the wet process phosphoric acid with the organic extractant to form a complex which then separates either or both the vanadium and uranium therefrom. The organic extractant then is separated from the wet process phosphoric acid, scrubbed with water in some processes and then stripped of either or both the vanadium and uranium by contact with a stripping solution.

The presence of the soluble impurities, particularly calcium sulfate and sodium or potassium fluorosilicates, in the wet process phosphoric acid has presented certain difficulties in the successful extraction and recovery of either or both the vanadium and uranium. During solvent extraction treatment of the wet process phosphoric acid, the calcium sulfate and other impurities often precipitate forming sediments or scales within the extraction process apparatus. The sediments contaminate the selective organic extractants and limit their ability to separate the vanadium and uranium from the wet process phosphoric acid. The scales which form on the apparatus result in apparatus plugging and other operational difficulties.

It is desirable to provide a method for preparing wet process phosphoric acid from which either or both vanadium and uranium may be recovered by organic solvent extraction, the wet process phosphoric acid having been stabilized to prevent the precipitation of sediments or scales of impurities during said recovery.

SUMMARY OF THE INVENTION

The discovery now has been made that wet process phosphoric acid containing soluble impurities can be stabilized to prevent the precipitation of sediments or scales during the recovery of either or both vanadium and uranium or other valuable minerals by solvent extraction.

In accordance with the process of the present invention, wet process phosphoric acid is introduced into a vessel which contains a crystal seed bed comprised of crystallized impurities to facilitate precipitation of impurities which are contained in the wet process phosphoric acid in supersaturated form. The supersaturation of the impurities is effected through cooling and evaporation of water from a portion of the wet process phosphoric acid which then is recycled to the seed bed-containing vessel. A second portion of the wet process phosphoric acid containing precipitated impurities is withdrawn from the vessel and introduced into a separator.

In the separator, the wet process phosphoric acid containing precipitated impurities is separated into a substantially solids-free stream and a solids-containing stream. The solids-containing stream is withdrawn from the separator and a portion thereof may be recycled to the seed bed-containing vessel to maintain the crystal seed bed. The substantially solids-free stream in withdrawn and introduced into a clarifier, if necessary, to further clarify the aqueous solution. The wet process phosphoric acid then is admixed with an aqueous diluent to reduce the concentration of the precipitable impurities remaining therein to a concentration below their saturation level. The precipitation of impurities and dilution of the wet process phosphoric acid as hereinbefore described effects a stabilization of the impurities remaining in the aqueous solution without a significant change in the phosphate concentration of the solution. The stabilized wet process phosphoric acid then can be introduced into a solvent extraction process to recover either or both vanadium and uranium or other valuable minerals without substantial formation of sediments or scales caused by precipitation of impurities within the process apparatus.

Thus, stabilized wet process phosphoric acid means an aqueous solution of phosphoric acid that has been treated to effectively inhibit the subsequent precipitation of impurities contained in the solution during storage or solvent extraction treatment.

BRIEF DESCRIPTION OF THE DRAWING

The single FIGURE is a schematic, diagrammatic illustration of a process to stabilize wet process phosphoric acid and to effect solvent extraction of valuble minerals therefrom.

BRIEF DESCRIPTION OF THE PREFERRED EMBODIMENT

An aqueous acidic solution comprising wet process phosphoric acid flowing in a conduit 10 is introduced into a vessel 12 comprising, such as, for example, a crystallizer or the like. The wet process phosphoric acid contains soluble impurities, such as, for example, calcium, iron, sodium, potassium, magnesium and aluminum salts. The acid also contains valuable quantities of either or both vanadium and uranium or other minerals suitable for recovery by solvent extraction using select organic extractants.

In some instances, it may be necessary to change the valence state of the specie that is to be extracted by the organic extractant. The change in valence may be accomplished through addition of chemical oxidizing or reducing agents, as required. The change in valence state also may be achieved electrolytically. Such changes may be effected prior to introduction of the wet process phosphoric acid into the vessel 12, immediately prior to solvent extraction or at any other convenient location in the process herein described.

The vessel 12 contains a crystal seed bed of various crystallized impurities which acts as nucleating centers to aid in the precipitation of impurities from the wet process phosphoric acid and further provide a large surface area upon which the crystallizing impurities may deposit. The quantity of crystalline seed material required is that which is sufficient to provide effective precipitation of the impurities from the wet process phosphoric acid.

The quantity of impurities deposited on the crystalline seed material depends upon the crystal growth rate and surface area available for deposition. The growth rate is a function of the supersaturation of a particular impurity in the wet process phosphoric acid. To facilitate precipitation of the impurities, a first portion of the wet process phosphoric acid is withdrawn from the vessel 12 through a conduit 14 and introduced into a heat exchanger 16. The heat exchanger functions to elevate the temperature of the wet process phosphoric acid, if necessary, to permit effective concentration of the acid and a higher supersaturation of the impurities through flash cooling. In the particular embodiment illustrated, the wet process phosphoric acid is heated with steam, however, other heat exchange fluids also may be employed. The wet process phosphoric acid is withdrawn from the heat exchanger 16 and introduced into a flash cooler 20 via a conduit 18.

Merely for the purpose of facilitating an understanding of the present invention, and not by way of limitation, particular conditions will be designated for the wet process phosphoric acid in various conduits of the process. It is to be understood that the particular conditions will vary depending upon the quantities of impurities in the wet process phosphoric acid and the particular apparatus employed in the process. The wet process phosphoric acid flowing in conduit 10 has a temperature of about 160 degrees F. The acid in vessel 12 and conduit 14 has a temperature of about 110 degrees F. A quantity of the wet process phosphoric acid is heated in heat exchanger 16 prior to introduction into flash cooler 20. Approximately one pound of water can be evaporated from the aqueous acidic solution within the flash cooler for each 1000 BTU of thermal energy that is transferred to the acid by the heat exchanger.

In flash cooler 20, the wet process phosphoric acid is cooled by evaporation of at least a portion of the liquid, primarily water, to a temperature of from about 100 degrees F. to about 135 degress F. and preferably a temperature of from about 105 degrees F. to about 115 degrees F. The flash cooling of the wet process phosphoric acid and evaporation of water therefrom causes the impurities contained in the aqueous acidic solution to become supersaturated. The cooled wet process phosphoric acid is withdrawn from the cooler 20 via a conduit 22 and recycled to the vessel 12 to mix with the wet process phosphoric acid entering via conduit 10. The contacting of the supersaturated acid with the crystal seed bed in the vessel 12 effects a precipitation of a portion of the impurities in the wet process phosphoric acid.

The preceeding steps of the process are effected for a sufficient time to precipitate a substantial portion of the precipitable impurities contained in the wet process phosphoric acid. Normally, the duration of this portion of the process is from about 10 minutes to about 60 minutes, however, it is to be understood that a longer time may be employed, but such is not required for effective treatment.

The vapor formed in the flash cooler 20 is withdrawn through a conduit 24 and introduced into a condenser 26 wherein the vapor is condensed. The condensed liquid, which may comprise from about 5 to 10 percent of the volume of wet process phosphoric acid originally present, is primarily water and may be disposed of through any suitable method or recovered for other use.

A second portion of the wet process phosphoric acid containing precipitated impurities is withdrawn from vessel 12 through a conduit 28 and introduced into a separator 30. In separator 30, the wet process phosphoric acid containing the precipitated impurities is separated into a substantially solids-free stream and a solids-containing stream. The solids-containing stream is withdrawn from separator 30 through a conduit 32. A portion of the solids-containing stream in conduit 32 may be recycled via a conduit 34 to the vessel 12 to maintain a sufficient quantity of crystalline material in the crystal seed bed. The substantially solids-free stream is withdrawn from separator 30 through a conduit 36 and introduced into a clarifier 38. Separator 30 may comprise a thickener, filter, centrifuge or any other apparatus which effects the designated separation. If the separator 30 is a thickener, the residence time of the wet process phosphoric acid in separator 30 may be from about 1 hour to about 4 hours or longer depending upon the design.

To facilitate the separation in separator 30, a flocculating agent may be added to the wet process phosphoric acid contained therein. The flocculating agent may comprise any conventional commercial flocculating agent which is stable in mineral acid solutions. The flocculating agent increases the settling rate of the solids that are suspended in the wet process phosphoric acid.

In clarifier 38, the substantially solids-free wet process phosphoric acid is further treated to remove additional precipitate, if any, that was not removed in separator 30. Depending upon the particular apparatus selected for separator 30, the clarifier 38 may not be required. The clarified wet process phosphoric acid then is withdrawn from clarifier 38 via a conduit 40 and admixed with an aqueous diluent entering conduit 40 through a conduit 42. The quantity of aqueous diluent admixed with the wet process phosphoric acid is that which is sufficient to lower the concentration of the precipitable impurities remaining in the wet process phosphoric acid below their saturation level. Advantageously, the aqueous diluent comprises at least a portion of an aqueous scrub liquor from the subsequent solvent extraction process. The use of the aqueous scrub liquor permits a recovery of phosphate values that would otherwise be lost from the wet process phosphoric acid. Normally, a quantity of aqueous diluent of from about 1 to about 4 percent by volume of the wet process phosphoric acid is sufficient to reduce the concentration of the precipitable impurities below their saturation level, however, larger quantities may be employed. The use of larger quantities of diluent has the disadvantage of unnecessarily diluting the phosphoric acid concentration of the aqueous acidic solution.

The diluted wet process phosphoric acid then may enter a heat exchanger 44. Heat exchanger 44 is employed to adjust the temperature of the wet process phosphoric acid to the optimum temperature for the particular solvent extraction process that is employed. In some circumstances heat exchanger 44 may not be required. The wet process phosphoric acid is withdrawn from heat exchanger 44 through a conduit 46 and introduced into the solvent extraction zone 48. In extraction zone 48, the wet process phosphoric acid is contacted with a select organic extractant which separates either or both the vanadium and uranium or other desired mineral values from the wet process phosphoric acid. The organic extractant then is withdrawn through a conduit 52 and introduced into a solvent scrub zone 54. The wet process phosphoric acid is withdrawn from the solvent extraction zone 48 through a conduit 50.

In solvent scrub zone 54, the organic extractant is contacted with water entering via a conduit 56 to scrub any remaining acid from the extractant to form an aqueous scrub liquor. The aqueous scrub liquor is withdrawn from the solvent scrub zone 54 through a conduit 58. At least a portion of the aqueous scrub liquor in conduit 58 may be withdrawn through conduit 42 for use as the aqueous diluent introduced into conduit 40. The scrubbed solvent then is withdrawn from scrub zone 54 via a conduit 60 and introduced into a solvent stripping zone 62.

In solvent stripping zone 62 the organic extractant is contacted with a stripping solution entering via a conduit 64. The stripping solution separates the vanadium, uranium or other extracted mineral values from the organic extractant to form an extraction products stream. The extraction products stream is withdrawn from stripping zone 62 through a conduit 66. The stripped organic extractant is withdrawn from stripping zone 62 through a conduit 68 and recycled to solvent extraction zone 48.

Through the process of the present invention, the solvent extraction process is achieved without substantial formation of sediments in the extraction apparatus or scaling caused by precipitation of impurities upon the interior surfaces of the extraction apparatus.

The particular solvent extraction treatment employed to effect the recovery of the vanadium, uranium or other valuable minerals from the wet process phosphoric acid may be any of those which employ organic extractants that are not subject to substantial degradation through contact with wet process phosphoric acid. Suitable processes include, for example, the process disclosed in U.S. Pat. Nos. 3,700,415; 3,737,513; 3,764,274 and 3,836,476.

In an alternate embodiment of the present invention (not shown), the wet process phosphoric acid flowing in conduit 10 may be introduced directly into heat exchanger 16 and then flash cooled prior to introduction into the crystallizer vessel 12. Then, solids separation, clarification, if necessary, and solvent extraction are performed as previously set forth.

In yet another embodiment, a heating coil (not shown) may be installed within a portion of crystallizer vessel 12 to provide a portion or all of the thermal energy necessary to effect evaporation of water from the wet process phosphoric acid within the flash cooler 20.

For the purpose of illustrating the present invention and not by way of limitation, the following example is provided.

EXAMPLE

Wet process phosphoric acid containing soluble impurities maintained at a temperature of about 160 degrees F. is introduced into a flash cooler wherein water is evaporated and the temperature of the acid is reduced to a level of about 110 degrees F. The cooled wet process phosphoric acid, now supersaturated with respect to impurities, is withdrawn from the flash cooler and contacted with a crystal seed bed comprising calcium sulfate and other salts for a period of about 1 hour. During the contacting with the crystal seed bed, solids are deposited from the cooled wet process phosphoric acid and supersaturation of the acid soluble impurities is substantially relieved.

The wet process acid then is introduced into a settler with about a 3 hour residence time. The supernate from the settler is admixed with a portion of an aqueous scrub liquor from a solvent extraction process to be hereinafter described to form a diluted wet process phosphoric acid. This dilution serves to relieve most or all of the remaining supersaturation of the impurities in the wet process phosphoric acid. The portion of aqueous scrub liquor comprises about 5 percent by volume of the initial volume of the wet process phosphoric acid. The diluted supernate then is heated to a temperature of about 120 degrees F. preparatory for solvent extraction. This reheating also assists in controlling and stabilizing the feed solution to the solvent extraction process with respect to the deposition of solids during extraction.

The diluted wet process phosphoric acid is introduced into a solvent extraction process operated at about 120 degrees F. wherein vanadium contained therein is extracted into an organic phase comprising 0.25 M tri-n-octylphosphine oxide in kerosene in four countercurrent stages. The organic to aqueous ratio within the extraction stages is maintained at one to one and the contact time is about 20 minutes in each stage. The organic phase is separated from the wet process phosphoric acid, scrubbed with water to provide the aqueous scrub liquor for dilution and contacted with a stripping solution comprising sodium carbonate to separate the extracted vanadium from the organic phase. The separation is effected without the formation of significant quantities of sediments in the process apparatus and without the formation of significant scales on the interior surfaces of the process apparatus.

By way of contrast, when a similar sample of wet process phosphoric acid is introduced into the solvent extraction process without prior impurities stabilization, a fine sediment comprising primarily calcium sulfate forms in the solvent extraction apparatus and some scale formation is found to occur in the pipes of the process apparatus.

While the present invention has been described with respect to what at present are considered to be the preferred embodiments thereof, it is to be understood that changes or modifications in the apparatus or procedure can be made without departing from the spirit or scope of the invention as defined by the following claims.

What is claimed is:
1. A process for recovering vanadium comprising:
   treating at least a portion of a quantity of aqueous phosphoric acid having soluble impurities including vanadium associated therewith to concentrate the same and provide a quantity of concentrated aqueous phosphoric acid in which at least a portion of said soluble impurities associated therewith are supersaturated;

contacting at least a portion of said concentrated aqueous phosphoric acid containing said supersaturated soluble impurities with a crystal seed bed consisting of impurities similar to the soluble impurities associated with said aqueous phosphoric acid to cause at least a substantial portion of said supersaturated soluble impurities to precipitate;

separating said precipitated impurities from said concentrated aqueous phosphoric acid and the remaining unprecipitated soluble impurities including vanadium;

providing an aqueous diluent;

admixing said concentrated aqueous phosphoric acid and the remaining unprecipitated soluble impurities with said aqueous diluent to form a diluted solution;

contacting said diluted solution with an organic extractant to selectively extract vanadium from the remaining unprecipitated soluble impurities without the substantial precipitation of any other of the remaining soluble impurities; and recovering said vanadium selectively extracted by said organic extractant.

2. A process for recovering uranium comprising:

treating at least a portion of a quantity of aqueous phosphoric acid having soluble impurities including uranium associated therewith to concentrate the same and provide a quantity of concentrated aqueous phosphoric acid in which at least a portion of said soluble impurities associated therewith are supersaturated;

contacting at least a portion of said concentrated aqueous phosphoric acid containing said supersaturated soluble impurities with a crystal seed bed consisting of impurities similar to the soluble impurities associated with said aqueous phosphoric acid to cause at least a substantial portion of said supersaturated soluble impurities to precipitate;

separating said precipitated impurities from said concentrated aqueous phosphoric acid and the remaining unprecipitated soluble impurities including uranium;

providing an aqueous diluent;

admixing said substantially concentrated aqueous phosphoric acid and the remaining unprecipitated soluble impurities with said aqueous diluent to form a diluted solution;

contacting said diluted solution with an organic extractant to selectively extract uranium from the remaining unprecipitated soluble impurities without the substantial precipitation of any other of the remaining soluble impurities; and recovering said uranium selectively extracted by said organic extractant.

3. A process for recovering vanadium and uranium comprising:

treating at least a portion of a quantity of aqueous phosphoric acid having soluble impurities including vanadium and uranium associated therewith to concentrate the same and provide a quantity of concentrated aqueous phosphoric acid in which at least a portion of said soluble impurities associated therewith are supersaturated;

contacting at least a portion of said concentrated aqueous phorphoric acid containing said supersaturated soluble impurities with a crystal seed bed consisting of impurities similar to the soluble impurities associated with said aqueous phosphoric acid to cause at least a substantial portion of said supersaturated soluble impurities to precipitate;

separating said precipitated impurities from said concentrated aqueous phosphoric acid and the remaining unprecipitated soluble impurities including vanadium and uranium;

providing an aqueous diluent;

admixing said concentrated aqueous phosphoric acid and the remaining unprecipitated soluble impurities with said aqueous diluent to form a diluted solution;

contacting said diluted solution with an organic extractant to selectively extract vanadium and uranium from the remaining unprecipitated soluble impurities without the substantial precipitation of any other of the remaining soluble impurities; and recovering said vanadium and uranium selectively extracted by said organic extractant.

4. The process of claim 3 defined further to include the step of:

admixing a flocculating agent with said concentrated aqueous phosphoric acid, the remaining unprecipitated soluble impurities and precipitated impurities before separating said precipitated impurities therefrom.

5. The process of claim 3 wherein treating at least a portion of a quantity of aqueous phosphoric acid to concentrate the same and contacting the concentrated portion with the crystal seed bed is defined further as:

introducing the aqueous phosphoric acid having soluble impurities associated therewith into a crystallizer containing a crystal seed bed consisting of impurities similar to the soluble impurities;

withdrawing a portion of said aqueous phosphoric acid and the soluble impurities associated therewith from said crystallizer;

heating said withdrawn portion to an elevated temperature;

flash cooling said heated withdrawn portion to evaporate at least a portion thereof and thereby concentrate said unevaporated portion and cause at least a portion of the soluble impurities associated therewith to become supersaturated; and recycling said concentrated portion to said crystallizer.

6. The process of claim 3 wherein treating is defined further as:

heating said quantity of aqueous phosphoric acid having soluble impurities associated therewith to an elevated temperature; and flash cooling said heated aqueous phosphoric acid to evaporate at least a portion thereof and thereby provide, as the unevaporated portion, said concentrated aqueous phosphoric acid in which at least a portion of said soluble impurities associated therewith are supersaturated.

7. The process of claim 6 wherein the aqueous phosphoric acid is heated to a temperature above 160 degrees F.

8. The process of claim 6 wherein the heated aqueous phosphoric acid is cooled to a temperature in the range of from about 100 degrees F. to about 135 degrees F.

9. The process of claim 6 wherein the aqueous phosphoric acid is cooled to a temperature in the range of from about 105 degrees F. to about 115 degrees F.

* * * * *